US008357032B2

(12) United States Patent
Naicker

(10) Patent No.: US 8,357,032 B2
(45) **Date of Patent: *Jan. 22, 2013**

(54) ONLINE BLACKJACK TOURNAMENTS WITH OPTION TO PURCHASE CARD COUNTING REPORT

(75) Inventor: Theo Naicker, Durban (ZA)

(73) Assignee: Cork Group Trading Ltd., Tortola (VG)

( * ) Notice: Subject to any disclaimer, the term of this patent is extended or adjusted under 35 U.S.C. 154(b) by 1539 days.

This patent is subject to a terminal disclaimer.

(21) Appl. No.: 11/522,134

(22) Filed: Sep. 14, 2006

(65) Prior Publication Data

US 2008/0070659 A1 Mar. 20, 2008

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ................ 463/12; 463/11; 463/13; 463/16; 463/21

(58) Field of Classification Search ..................... 463/12
See application file for complete search history.

(56) References Cited

U.S. PATENT DOCUMENTS

| | | | | |
|---|---|---|---|---|
| 4,531,187 | A * | 7/1985 | Uhland | 463/12 |
| 5,374,061 | A | 12/1994 | Albrecht | 273/149 R |
| 5,397,133 | A | 3/1995 | Penzias | 463/22 |
| 5,451,054 | A | 9/1995 | Orenstein | 273/148 R |
| 5,603,502 | A | 2/1997 | Nakagawa | 273/292 |
| 5,735,525 | A | 4/1998 | McCrea, Jr. | 273/309 |
| 5,970,143 | A * | 10/1999 | Schneier et al. | 713/181 |
| 6,364,765 | B1 * | 4/2002 | Walker et al. | 463/16 |
| 6,869,074 | B2 * | 3/2005 | Miller | 273/292 |
| 6,902,166 | B2 | 6/2005 | Stern | 273/292 |
| 7,727,070 | B2 * | 6/2010 | Shelby et al. | 463/42 |
| 2002/0155872 | A1 | 10/2002 | Odom et al. | 463/13 |
| 2002/0165029 | A1 | 11/2002 | Soltys et al. | 463/47 |
| 2003/0195043 | A1 | 10/2003 | Shinners et al. | 463/42 |
| 2004/0100025 | A1 | 5/2004 | Conklin et al. | 273/292 |
| 2004/0160009 | A1 | 8/2004 | Vancura et al. | 273/292 |

(Continued)

FOREIGN PATENT DOCUMENTS

| | | |
|---|---|---|
| WO | WO03/093921 | 11/2003 |
| WO | WO 2004/112923 | 12/2004 |

OTHER PUBLICATIONS

Partial European Search Report in EP Application No. 07253661.8, dated Jan. 24, 2008.

(Continued)

*Primary Examiner* — Michael Cuff
*Assistant Examiner* — Kevin Y Kim
(74) *Attorney, Agent, or Firm* — McDonnell Boehnen Hulbert & Berghoff LLP

(57) ABSTRACT

Online blackjack tournaments are described which provide a facility by which a player in the blackjack tournament may purchase a card counting report to assist in their play. The card counting report could be purchased with cash or cash equivalent, or with chips assigned to the player for play in the tournament. The player may select the format or content for the card counting report. The report could be purchased for the entire tournament, a round of the tournament, or for one or more hands. In one variation, the card counting report is generated by a central gaming server. In another variation, the card counting report is generated locally by a client process executing on a workstation used by a player to play in the tournament.

25 Claims, 4 Drawing Sheets

U.S. PATENT DOCUMENTS

| | | | | |
|---|---|---|---|---|
| 2005/0051965 | A1 * | 3/2005 | Gururajan | 273/292 |
| 2005/0062226 | A1 | 3/2005 | Schubert et al. | 273/149 R |
| 2005/0173862 | A1 | 8/2005 | Orenstein | 273/292 |
| 2005/0227760 | A1 | 10/2005 | Vlazny et al. | 463/28 |
| 2006/0128453 | A1 | 6/2006 | Hoffman | 463/12 |
| 2006/0199649 | A1 | 9/2006 | Soltys et al. | 463/47 |
| 2006/0279045 | A1 * | 12/2006 | Thomas et al. | 273/292 |
| 2007/0099687 | A1 * | 5/2007 | Gerson et al. | 463/16 |

OTHER PUBLICATIONS

Extended European Search Report in European Application No. 07253648.5, dated Jan. 30, 2008.

U.S. Appl. No. 11/521,967, filed Sep. 14, 2006.

Office Action mailed Feb. 22, 2008 in U.S. Appl. No. 11/521,967, filed Sep. 14, 2006.

European Search Report in EP Application No. 072553661.8, dated Jun. 10, 2008.

Donald Catlin, Black Jack Tournament Play: What's Luck Got to Do With It?, Casino City Times, Aug. 2, 2005, downloaded from the World Wide Web from http://catlin.casinocitytimes.com/articles/6158.html.

Stanley Sludikoff, Blackjack Encyclopedia of Casino Twenty-One: Gambling Times, Gambling Times Magazine, May 30, 2001, downloaded from the World Wide Web from http://www.bjrnet.com/member/bjapr/Pubs_GT.htm.

Chuck Greene, Where to Play Single-Deck Blackjack, Winner Online.Com, Apr. 10, 2001, downloaded from the World Wide Web from http://www.winneronline.com/articles/april2001/singledeckblackjack.htm.

QFIT, Casino Vérité Blackjack—Shuffle Tracking & Ace Sequencing Software—CVShuffle, Feb. 12, 2005, downloaded from the World Wide Web from http://web.archive.org/web/20050212031215/http://www.qfit.com/shuffle-tracking.htm.

John Grochowski, Take this blackjack quiz to learn something about the game, The Detroit News, detnew.com, Casino Guide, Mar. 3, 2005, downloaded from the World Wide Web from http://info.detnews.com/casino/newdetails.cfm?column=grochowski&myrec+267.

Blackjack 21, BlackJack 21 News, May 29, 2006, downloaded from the World Wide Web from http://www.blackjack21.net.

Ken Smith, Pharaoh's Single Deck, Hour 1 of 10, Ken Smith's Blackjack Blog, Jul. 22, 2005, downloaded from the World Wide Web from http://www.blackjackinfo.com/bloq/2005/07/pharaohs-single-deck-hour-1-of-10.htm.

Edward Thorp, "A Favorable Strategy for Twenty-One", Proc. N.A.S. pp. 110-112 (1962).

www.worldseriesofpoker.com web pages (2006).

Edward O. Thorp, "Beat the Dealer: A Winning Strategy for the Game of Twenty-One", Vintage Books Edition 1966.

* cited by examiner

Fig. 3
100
| 120 SYSTEM | 122 RUNNING COUNT | 124 SIDE COUNT | 126 TRUE COUNT (SC TRUE COUNT) |
|---|---|---|---|
| K-0 | +3 | — | — |
| HIGH-LOW | +2 | +1 | +3 (+2) |
Fig. 4
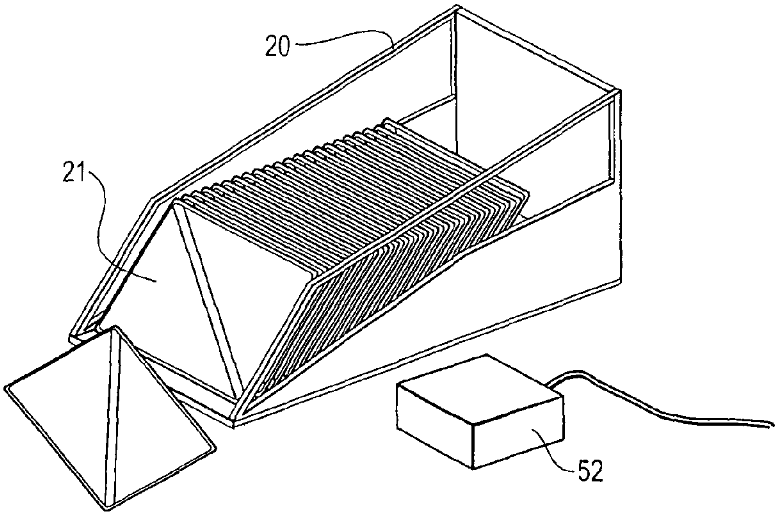
Fig. 5
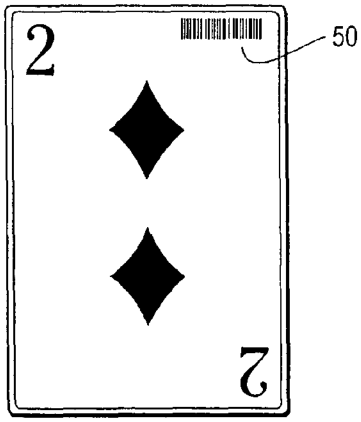

ONLINE BLACKJACK TOURNAMENTS WITH OPTION TO PURCHASE CARD COUNTING REPORT

RELATED APPLICATION

This application is related to a patent application Ser. No. 11/521,967 filed concurrently, entitled "Blackjack Tournaments With Rules Encouraging Card Counting and Broadcasts Thereof", now issued as U.S. Pat. No. 7,637,506, the entire contents of which are incorporated by reference herein.

FIELD

This disclosure relates generally to the field of card games and more particularly to the game of blackjack, tournaments featuring blackjack, broadcasts of blackjack tournaments, and on-line blackjack tournaments.

BACKGROUND

The game of blackjack, also known as twenty-one ("21"), is a popular wager game played with one or more standard decks of playing cards. The rules of blackjack are described in the game literature and will not be detailed here. The rules also vary slightly depending on the casino or country where the game is played. Suffice it to say that, in most forms of the game, the player makes a wager and then receives two cards face down from a dealer. The dealer receives two cards, one face down and the other face up. The player then elects to either receive one or more cards from the dealer or retains the cards he has, hoping that the sum of the point count for the cards in his hand does not exceed 21. The dealer follows fixed rules as to whether to sit on its two cards or receive one or more additional cards. If the player does not "bust" (the sum of the point count of cards in his hand exceeds 21) but the dealer busts, then the player wins, e.g., an amount equal to the amount wagered. If the player busts, the player loses his wager. If neither the player nor the dealer bust, then if the sum of the point count of the player's hand is greater than that of the dealer, the player wins. If there is a tie, the player's wager is returned. If the dealer's hand is closer to 21 than the player, the player loses. Aces can be counted as either 1 or 11.

In general, the house (dealer) has a slight advantage over the player at blackjack under the rules governing play at all casinos. Therefore, casinos can offer blackjack as wager game in which it may lose money to some players, but in the long run the casino will make money on the enterprise.

Blackjack's popularity stems, at least in part, from the great mystique associated with systematic ways of playing the game to minimize the house advantage. In the early 1960's, a mathematician and university professor, Edward O. Thorp, used a computer to analyze the game of blackjack and discovered a set of rules for systematically playing the game of blackjack. Thorp's system takes into account the point value of cards which are exposed to the player during the course of play. If the game is played in accordance with rules developed by Thorp, the house advantage can not only be negated, but actually turned into an advantage for the player. Thorp's book "Beat the Dealer", second edition, Vintage Books (1966), has emerged as a classic text on blackjack and card counting. The book includes several accounts of Thorp, and others using his system, making large sums of money playing blackjack at casinos.

Card counting techniques, of which there are several explained in Thorp's book, essentially are techniques by which the player obtains a strategy for determining whether to receive an additional card or cards as a result of noting or counting cards from the deck which have been revealed to the player as a result of having been dealt to the player, dealt face up to the dealer, or dealt to other players. Depending on the cards that have been revealed, the advantage (i.e., statistical probability that a player will beat the dealer using the card counting technique) may swing to the dealer, or to the player, sometimes strongly so. An example of where the player may have a strong advantage is when the game is played from a single deck of 52 cards and the cards are dealt down to the last card. Using Thorp's card counting techniques, the player can determine when a player has an advantage, or when the dealer has an advantage. When the advantage is to the player and particularly strongly so (a situation detectable using Thorp's card counting methods), the player places a large wager. Conversely, when the advantage is to the dealer, the player places a small or minimum wager. Over the long term, card counting allows the player to gain a statistical advantage over the dealer. The player will profit from his play, provided that Thorp's methods are rigidly adhered to, the player places large or small wagers in accordance with Thorp's rules, and also provided that the rules are not changed during play and the dealer does not cheat.

Although card counting adds to blackjack's popularity, because it works to negate the house edge, casinos, and establishments more generally, have actively discouraged card counting techniques in order to not lose money by offering blackjack. To minimize the ability for card counters to accurately count, for example, establishments enforce rules that tend to minimize a player's ability to count cards. For example, the establishments engage in practices such as increase the number of decks of cards that are used in the blackjack card shoe, shuffle the "spent" cards with the cards still left in the shoe regularly or after every hand, remove certain features of the game such as surrender and doubling, and even prevent known card counters from entering the given establishment or asking them to leave once discovered. It is estimated that casinos spend large sums to prevent card counting and to catch card counters.

Thus, while the prior art recognizes that card counting can be a successful technique for beating the dealer at blackjack, the art also teaches that casinos should take steps to prevent card counting in order to retain the house advantage.

This disclosure presents a distinct departure from the prior art, as it describes blackjack tournaments, suitable for offering in a casino establishment, in which card counting is not only tolerated but actually encouraged. In particular, the tournaments are conducted in accordance with one or more rules of play that are designed to facilitate counting of cards by card counters, such as dealing from a single deck of 52 cards down to the last card. The more proficient a player is at the methods of Professor Thorp, or at newer or even better card counting methods, the better the player can expect to do at the tournament. Accordingly, tournaments in accordance with aspects of the present disclosure might well be advertised under the banner "Card Counters Welcome!" Conversely, usage of such a banner at a blackjack establishment today in most circumstances would be virtually unthinkable because such establishments intentionally try to frustrate card counting.

SUMMARY

In a first aspect, a method is disclosed for conducting an online blackjack tournament for remotely located players over a computer network. The method includes steps of providing a pool of prize money for paying out to one or more winners of the tournament, providing a set of one or more rules for playing rounds of blackjack at the tournament, and conducting rounds of play of blackjack using the set of rules wherein during the rounds of play the players make wagers and receive winnings with chips provided by the proprietor of the tournament to the players. The method further includes a step of providing a facility whereby players in the blackjack tournament may purchase a card counting report during play of the tournament.

The feature of providing a facility of purchasing a card counting report for online poker tournaments is expected to encourage players that are not skilled in card counting to play in the tournaments. The player, in theory, will improve their performance in the tournament and increase the likelihood that they will be a winner if they have this advantage, than if they play without any assistance. This attraction will then lead to more players playing in the tournament, increasing the pool of prize money for the winning player(s), and lead to more revenue for the tournament proprietor due to more players paying the entrance fees.

The rules of play in the tournament may optionally be favorable to counting of cards, such as dealing from a single deck of cards down to the last card in the deck.

In one possible embodiment, the card counting report is generated by a central gaming server process and transmitted to a workstation associated with a player who has purchased the card counting report. In another variation, the card counting report could be generated by a client process executing on a workstation used by a player in the tournament.

The card counting report could be purchased with cash or cash equivalent, or with chips assigned to the player for playing in the tournament.

In one possible embodiment, the facility for purchasing a card counting report takes the form of a display screen displayed on a workstation of a player playing in the tournament. The display screen provides a menu of options for the card counting report. Such menu of options could include a menu of available content of the card counting report, such as for example a report according to a particular card counting methodology, or the distribution of cards remaining in a deck of cards to be dealt to the players and the dealer at a virtual card table. The menu of options could also take the form of a menu of options for when the player receives the card counting report, e.g., during the entire tournament, during a given round of a tournament, or for a particular hand or hands.

In another aspect, an online blackjack tournament apparatus is disclosed which includes a gaming server generating results of play of players playing in an online blackjack tournament. The players play at virtual blackjack tables. The gaming server transmits datagrams to workstations associated with the players at the virtual tables. The apparatus further includes a database storing data relating to play in the tournament. The data includes data relating to cards revealed to players at the virtual blackjack tables. The apparatus further includes a server process in the form of computer instructions which accesses the data from the database and responsively generates a card counting report for play occurring at at least one of the virtual blackjack tables. The gaming server transmits the card counting report to a workstation in which the associated player has purchased a card counting report.

In yet another aspect, online blackjack tournament apparatus is disclosed comprising a memory storing a client process comprising a set of software instructions for execution on a workstation playing in the online blackjack tournament. The client process includes instructions for receiving datagrams from a central gaming server. The datagrams indicate the cards revealed in the course of play at a virtual blackjack table at the tournament. The client process further includes a subroutine for displaying a card counting report for play occurring at a virtual blackjack table. The client process displays the card counting report on a display of the workstation. For example, if the player using the workstation has purchased a card counting report from the proprietor of the tournament, the card counting subroutine is activated and the card counting report is displayed in accordance with the terms of the purchase of the card counting report.

In one possible variation, the process of calculation of the card counting report is off-loaded to the client process instead of being generated in a server process, e.g., on the computing platform implementing the gaming server.

These and still other aspects and features of the present disclosure will be explained in the following detailed description.

BRIEF DESCRIPTION OF THE DRAWINGS

In the following discussion reference will be made to the drawings, in which:

FIG. 3 is an illustration of second example of a card counting report which may be provided in a television or broadcast of a tournament for the benefit of viewers.

FIG. 4 is an illustration of a mechanism for identifying the sequence of un-dealt cards in a shoe.

FIG. 5 is an illustration of a marker in the form of a bar code which is read by the mechanism of FIG. 5 in order to determine the sequence of un-dealt cards in the shoe of FIG. 4.

DETAILED DESCRIPTION

A. Blackjack Tournaments

Figure 1:
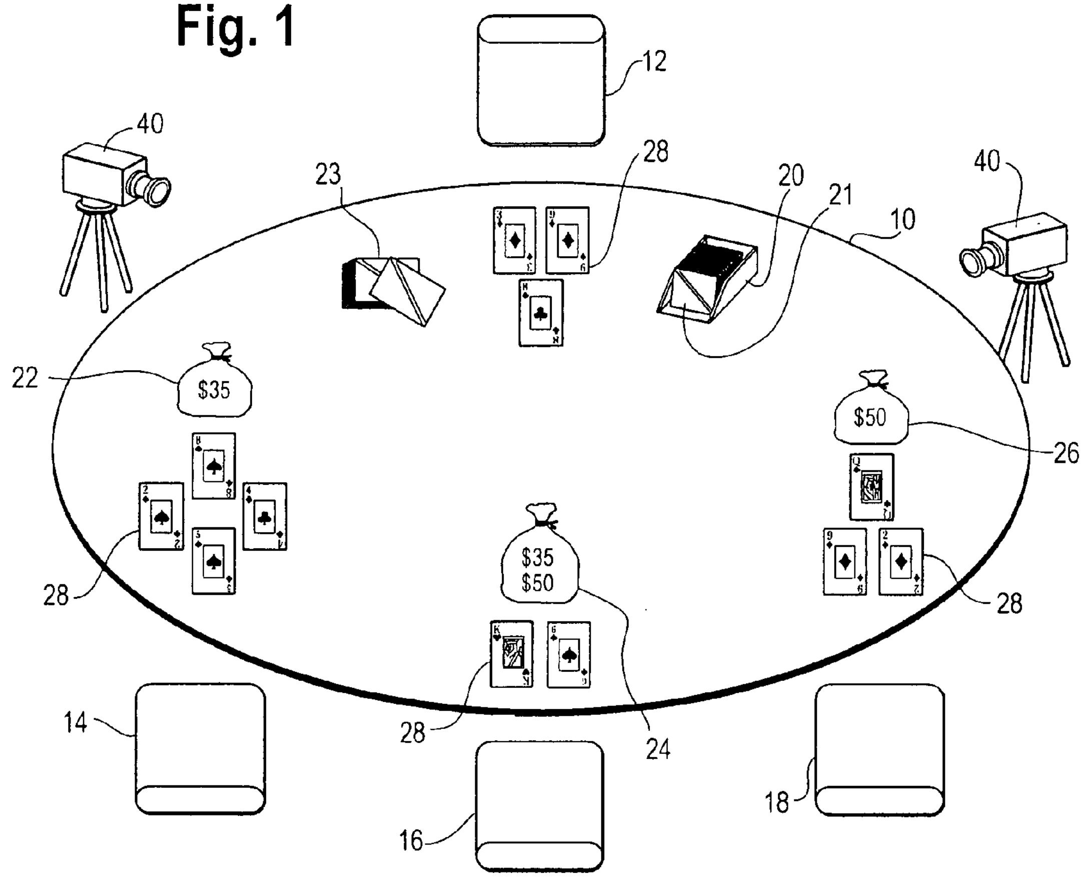
FIG. 1 is a schematic view of a blackjack table for use in the blackjack tournaments of this disclosure.

Multiplayer blackjack tournaments are described herein that are designed to facilitate and encourage players who approach the game in a systematic way and count cards to determine the best strategy for play. Currently, rules and practices for blackjack play at casinos are designed to frustrate or discourage card counters, such as rules increasing the number of decks of cards that are used in a blackjack card shoe, early shuffling of cards, i.e., reshuffling the cards while a significant proportion of the shoe (for example, a third or a half of the shoe) still remains unused, removing of certain game features that may be favorable to the player such as surrender and doubling features, and preventing known card counters from entering the blackjack establishment.

The blackjack tournaments of this disclosure preferably combine two features to attract card counters. Firstly, the tournaments features blackjack game rules and practices which are favorable for card counters. Such rules may include playing blackjack at each of the tables used in the tournament using a single deck of 52 cards and dealing the cards from the deck down to the last card in the deck. Alternatively, more than one deck could be used which is dealt down to the last card. Alternatively or additionally, the set of rules may include a rule of exposing all the cards of the players at each table to all the players at the table after each hand of play. The idea behind this rule is that as more cards are revealed, the player will have a greater idea of which cards remain in the deck and therefore obtain a more precise understanding of the correct play (e.g., whether to stand or whether to receive another card, or whether to place a large wager or a small wager). As another example, the set of rules may include a rule of exposing the cards of players who bust during play, again increasing the exposure of cards and allowing the player to obtain a greater degree of certainty as to the correct strategy as to standing, doubling, etc., and wager size. All three of these rules may be combined. Additional rules favorable to card counting may be adopted.

A second aspect of the tournament is that the tournament is structured so that the proprietor of the tournament (the entity awarding prize money to the winner) is not exposed to losses as would be expected to occur if the winnings for every hand were paid directly to the player from the house's bank account. Under the current state of the art, if no countermeasures are taken expert card counters can and will beat the dealer and will cause any casino to lose money, and potentially large sums of money. To counter this, the tournament proprietor forms a pool of prize money which is high enough in order to encourage card counters to participate in the blackjack tournament, but funds the prize money pool from some source or sources that limit or negate entirely the exposure to losses. For example, the pool of prize money could be formed from entrance fees paid by one or more players playing in the tournament. The pool of prize money could also be supplied by or augmented with sponsorship money from sponsors, e.g., hotels, casinos, television networks, car companies or other advertisers, or other parties. The sponsor of the tournament could also contribute to the pool of prize money, and thereby limit their exposure to the amount contributed to the pool.

The tournament features conducting rounds of play of blackjack using the set of rules favorable to card counting. During the rounds of play the players in the tournament make wagers and receive winnings with chips provided by the proprietor of the tournament to the players. For example, each player could receive some value of chips (say $5000 worth of chips), and the tournament has rules for the minimum and maximum wager amounts. Players are eliminated when they run out of chips or their chip total falls below a minimum level. Play continues in rounds, with players being eliminated until a final round of play occurs, and the player with the most chips after the final round wins the tournament. Variations on this general format are of course possible. However, unlike blackjack played in a casino where the player's winnings are paid by the house, the proprietor of the tournament is not exposed to losses due to card counting (beyond any amount contributed to the prize pool), since the reward for winning the tournament is paid out from the pool of prize money. Thus, card counting by the players playing in the tournament may be encouraged since the proprietor of the tournament is essentially not at risk.

A further example of a tournament will now be described. A multiplayer blackjack tournament is provided at a facility such as a casino and features one or more competition blackjack tables. There is a fixed buy-in amount and an entrance fee which is paid by each contestant. For example, if the buy-in amount is $40, and the entrance fee is $4, each player pays $44 to play. If the buy-in amount is $30, say, the entrance fee is $5; the player pays $35 to play.

The buy-in amount from all players in the tournament is pooled to form the tournament prize money. The tournament prize money may be augmented by sponsorship money from advertisers or the casino hosting the tournament. The entrance fee amount may be credited the operator of the casino to cover its costs in hosting the tournament.

Each player is awarded tournament chips at the beginning of the tournament. These chips are used as counters to determine the winner of the tournament. A player is eliminated from the tournament when the player has lost all his/her tournament chips.

The number of seats at each Blackjack table is three or five, and is configured when the tournament is set up. Each player plays against the dealer at the table, but not the house—i.e. payouts only affect a player's tournament chip balance. The contestants (players) play at a plurality of the tables simultaneously or in shifts if necessary to accommodate all the players.

The tournament consists of a number of betting rounds and each round consists of a predetermined number of hands. The number of hands for the first round is configured when the tournament is set up, the default number of hands for the first round being 30. The number of hands per round is a variable. For example, in Round 1 the number of hands is 30, and in Round 2 the number of hands may be 40. If the tournament has multiple rounds, players start each round with the same number of chips as the first round.

There is a minimum and maximum bet for each round. The minimum and maximum bet amounts may be variable per round, or fixed for all rounds of the tournament. The minimum and maximum bets are configured when the tournament is set up. The default minimum bet amount is $50.00 and the default maximum bet amount is $1,000.00 ($50.00×20). The minimum and maximum bet amounts increase per round (configured when the tournament is set up).

At the end of each round, the player at each table with the lowest number of tournament chips is eliminated and all other players proceed to the next round.

At the end of the tournament, the player with the highest number of tournament chips wins the largest share of the prize money. If two or more players tie, the winner is decided by sudden death.

As noted above, the play in each of the rounds features one or more rules for the game which are favorable to card counters, several of which were described previously. The remainder of the rules may be in accordance with standard practices, e.g., as set forth in Chapter 2 of Thorp's book. Doubling, splitting pairs, surrender, insurance and other features and variations of blackjack may optionally be provided.

B. Broadcasting of Tournaments

Blackjack tournaments in accordance with the methods of this invention are well suited for broadcasting on television or other entertainment networks (e.g., the Internet or cable TV networks) as entertainment for card players, thereby popularizing the tournament, attracting more players to casinos to play blackjack, and encouraging card counters to participate in future tournaments. Thus, the method may further include the steps of broadcasting the play of the tournament over an entertainment network.

Such broadcasts may optionally include features to provide the viewers of the broadcast with an "inside" look at the game which is not available to the players in the tournament, including providing a visual display of the sequence of cards yet to be dealt to players and the dealer during play, and providing a visual display of a card counting report in the broadcast of the play. The current card counting report can take a variety of forms, such as showing the distribution of the remaining cards in the deck, a + or − score or index using the high/low index system explained in Chapter 7 of Thorp's book "Beat the Dealer", second edition; the current ratio of tens to others as explained in Chapter 8 of Thorp's book, a table showing the ideal strategy given the current status of cards previously revealed, or otherwise. As a further feature, the broadcasting of the tournament may be accompanied by play commentary by one or more experts in the game of blackjack.

In another aspect of this disclosure, the invention can be considered as a novel arrangement of blackjack tournament apparatus. The apparatus includes a facility such as casino hosting a tournament of blackjack, the facility including one or more tables where blackjack may be played. The apparatus further includes one or more video cameras for capturing play at at least one of the tables for broadcast to an audience remote from the facility. The tournament is characterized in that a pool of prize money is formed for paying out to one or more winners of the tournament, e.g., at least in part from entrance fees paid by one or more players playing in the tournament or from sponsors. A set of rules is provided for play at the tournament for playing rounds of blackjack at the tournament wherein the rules include one or more rules favorable to counting of cards in a systematic method for playing blackjack. Rounds of play of blackjack are conducted at the tables using the set of rules wherein during the rounds of play the players make wagers and receive winnings with chips provided by the proprietor of the tournament to the players. The proprietor of the tournament is not exposed to losses due to card counting by players playing in the tournament and card counting by the players may be encouraged.

The blackjack tournament broadcast may optionally include an identification of the sequence of the cards remaining in a deck of cards used at one of the tables (either in whole or in part); and a card counting report, or commentary by one or more experts in the game of blackjack.

Turning now to the Figures, FIG. 1 is an illustration of a table 10 that may be used for play of blackjack play a tournament of this disclosure. The table 10 includes a dealer position 12, and player positions 14, 16 and 18. While three player positions are shown it will be understood that the table may accommodate a different number of players, such as 5 or more. The dealer deals cards from standard deck of 52 playing cards which are housed in a shoe 20. Each player has a pile of chips 22, 24, 26 from which to place wagers on hands of play. While the cards 28 are shown face up in FIG. 1, it will be understood that during play each player receives their initial two cards face down and cannot see the cards held by other players. Additional cards, if any, dealt to each player are dealt face up. The dealer's cards are dealt in the usual fashion, one face down and one face up, with additional cards dealt to the dealer dealt face up.

After each hand of play, players having a winning hand receive winnings in the form of additional chips from those wagered in that round of hands.

The dealer can be considered as having an infinite bankroll of tournament chips. Thus, at the end of a tournament round, it is quite possible for each player at a table to end up with a greater number of tournament chips than at the commencement of the round. The increase in tournament chips comes from the dealer's bankroll. It is worth noting again that at the commencement of each round of play all the players have the same number of tournament chips.

After each hand of play, "spent" cards 23 are collected on the side. The next hand of play continues and each player is dealt two cards face down and the dealer receives one card face down and another card face up. Play continues as before. The dealer continues to deal from the deck of cards 21 in the shoe until the last card in the deck is deal, all the "spent" cards are gathered up, reshuffled, placed in the shoe and play then continues. The process repeats at the table until players run out of chips at which point they are eliminated from the competition, or the round of play ends. At the end of the round, any players without a minimum number of chips are eliminated. Alternatively, the player(s) with the lowest amount of chips at each table are eliminated. Players advance to subsequent rounds, are gradually eliminated, and the rounds continued until a winner emerges.

Players are not allowed any aids for counting cards and must rely solely on their memory, their knowledge of their card counting system, and ability to quickly apply the system. Play is also not delayed unduly to give a player time to work out the correct play according to their system.

If the tournament is to be broadcast, the table 10 features one or more video cameras 40. Such cameras 40 are strategically placed to capture all the play at the table, Additional cameras could be placed adjacent to the dealer's hands and the player's hands to capture the cards which are dealt to the players for the benefit of the viewer. Alternatively, the cards dealt to the players could be determined by means of a card identifying mechanism incorporated into the shoe and described subsequently in FIGS. 4 and 5.

Figure 2:
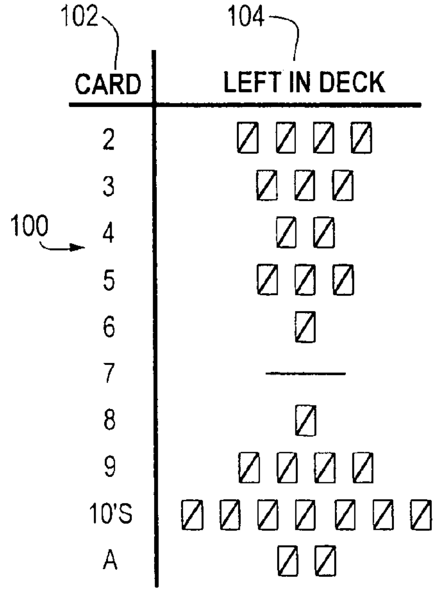
FIG. 2 is an illustration of a first example of a card counting report which may be provided in a television or other broadcast of the tournament for the benefit of viewers.

When the tournament is broadcast to viewers, the broadcast could be accompanied with a display of a card counting report in order to illustrate the state of the deck of cards, the probabilities facing the players, the correct strategy, etc, in order to stimulate further interest in the tournament. The format of the card counting report can take any variety of forms, two of which are shown in FIGS. 2 and 3. In FIG. 2, the card counting report 100 consists of a table of two columns. The left hand column 102 shows the point value of cards in the decks (Tens, Jacks, Queens and Kings are all scored 10, Aces are scored 1 or 11 and are shown merely as Aces). The right hand column 104 shows a distribution of each point value remaining in the deck. For example, at some given state of play the deck may contain four Twos, three Threes, no Sevens, etc. as shown in FIG. 2.

In FIG. 3 the card counting report 100 takes the form of a table showing card counting scores or indexes in various card counting systems that are currently popular. For example, the table includes a column 120 which identifies the system, and a second column 122 that gives the running count in that system. A third column 124 includes a running count in a side count, and a fourth column 126 that provides a still further count in the system, which may incorporate or depend from the counts in the other columns. A dashed line in FIG. 3 indicates that the count or index is not used in the system. While only two systems are shown in FIG. 3 (K-O and High-Low), the report of FIG. 3 may include any arbitrary number of systems.

It will be understood that the card counting reports of FIGS. 2 and 3 are offered by way of example only and not limitation and other formats for card counting reports are of course possible. Furthermore, the card counting reports may be shown displayed in conjunction with the video of play in any convenient manner, e.g., to the side of the video of play, as a scrolling text on the bottom margin of the display, or in any other format.

As a further feature for the viewer, the broadcast of the tournament may feature the sequence of cards which remain to be dealt to the players and the dealer, such sequence of course not being available to the players or the dealer. To determine such sequence, the tables at the tournament have some means for identifying the sequence of the cards in the deck. The means for identifying the cards could be incorporated into the shoe from which the cards are dealt. One example is shown in FIG. 4. The shoe 20 contains initially a deck of fifty two cards 21. Each card 21 is provided with a bar code 50 (FIG. 5) which appears on the face of the card. When the cards 21 are placed in the shoe, each of the cards is positioned one at a time adjacent to a bar code reader 52 which reads the bar code 50 on the face of the card. Thus, the reader will read each card in sequence and send the sequence of cards to a computer which is used to generate card data for the broadcast of the tournament. While a bar code and bar code reader are shown in FIGS. 4 and 5, other mechanisms may be used, such as incorporating the bar code reader into the table 10 (FIG. 1) and passing the cards over the reader prior to loading the cards into the shoe.

Figure 6:
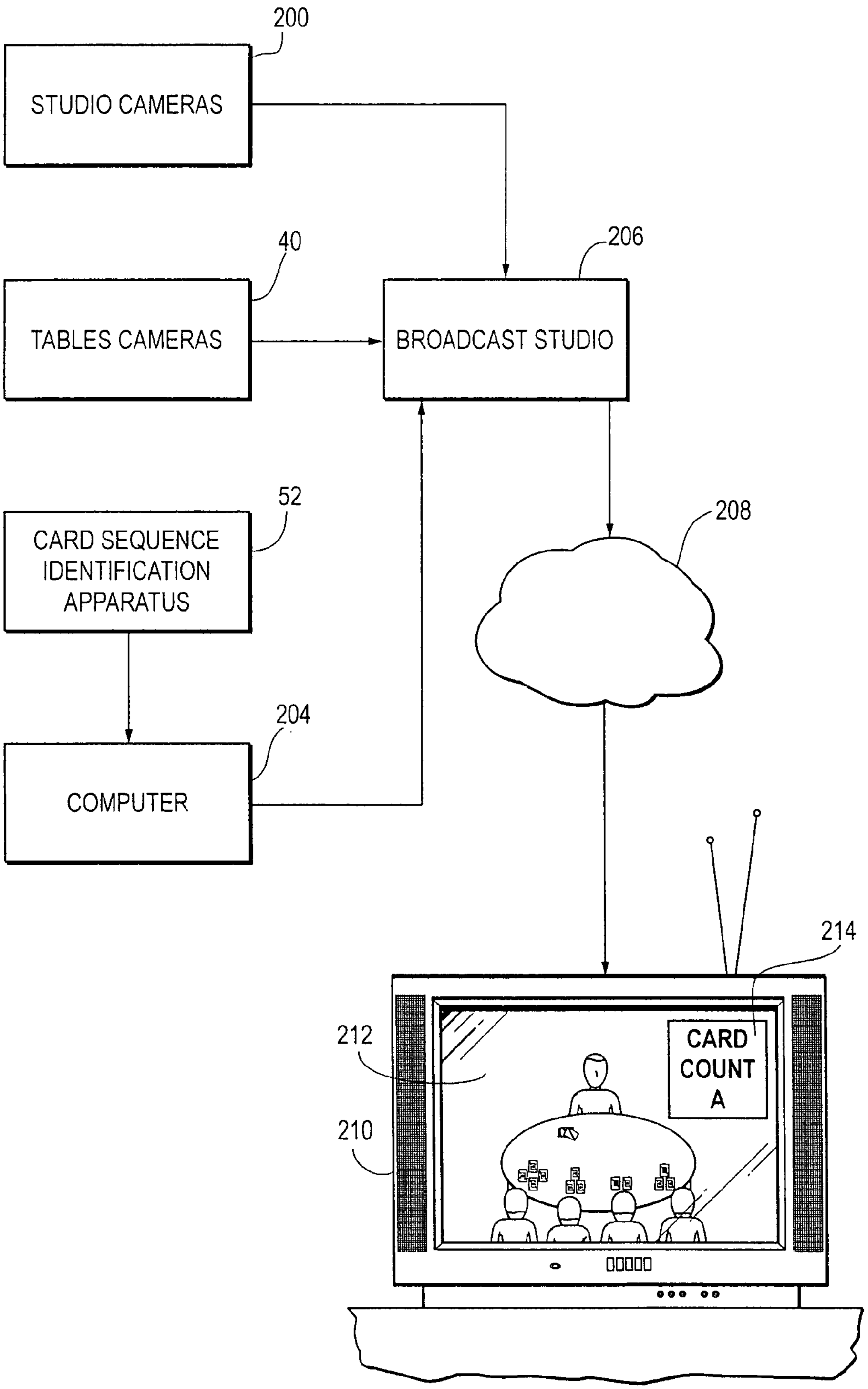
FIG. 6 is a schematic representation of one possible arrangement of the apparatus used in generating a broadcast video signal of a tournament as described herein.

FIG. 6 is a block diagram showing the apparatus which may be used to generate a broadcast of a tournament in accordance with one possible embodiment of this invention. The apparatus includes studio cameras and voice recording equipment 200 which capture voice and video of the host of the tournament program and experts on blackjack who provide commentary on the play. The apparatus further includes cameras 40 which are present at the tournament tables to capture video and sound of the play of the game and the cards dealt to the players. The apparatus further includes the card sequence identifying apparatus 52 which may take the form of the bar code reader 52 shown in FIG. 4. The apparatus further includes a computer 204 which receives the bar code data from the bar code reader and converts the bar codes to card values. The computer 204 is programmed to compute card counting reports as shown in FIGS. 2 and 3.

The audio/video feed from the studio cameras and voice recording equipment 200 and the table cameras 40 are fed to a broadcast production studio 206 for mixing and editing to generate a broadcast signal for distribution over an entertainment network 208. Further, the computer 204 provides card count reports and card sequence data to the broadcast production studio 206 for mixing, editing and addition to the broadcast signal. The resulting broadcast signal, typically in digital format, is generated at the studio and stored in a memory (not shown).

The broadcast signal is then distributed via the entertainment network 208 to viewers. The entertaining network 208 may take the form of a cable television network, Internet, or other network. The tournament can be viewed on a television set 210 having a display 212. The display 212 includes video of the tournament play captured by the cameras 40 at the tables, voice over commentary by experts captured by the studio camera and voice recording equipment 200, and video data comprising superimposed card counting reports 214 or card sequence data for cards remaining in the deck.

The details on generation of television programming are of course known to persons skilled in the art of television broadcasting and further explanation is deemed unnecessary in order to not obfuscate the present disclosure.

C. On-Line Blackjack Tournaments with Purchase of Card Counting Report

One further aspect of this disclosure relates generally to methods and systems for providing online, real-time blackjack tournaments that are played by remotely-situated players over computer networks such as the Internet. One further aspect of this disclosure relates to methods of providing such on-line blackjack tournaments in which the players playing on a remote computer or workstation are provided with an option of purchasing a card counting report. Such a card counting report could be purchased prior to commencement of play (for the entire tournament), just prior to a start of a round for just a particular round, or alternatively at any time during play, e.g., for one or more hands during a round.

In one variation, the purchase of a card counting report may be by means of cash or cash equivalent. The money paid for the card counting report could be paid to the proprietor or host of the tournament, or perhaps some portion of it could be added to the tournament prize money. Alternatively, the purchase of the card counting report could be made by means of the player surrendering some of their chips, thereby putting the player at a disadvantage to other players. The "cost" of the card counting report could depend on whether the card counting reports are to be provided for all rounds, a particular round, or a limited number of hands. It is then up to the player to use the card counting report to best effect by making appropriate game play and wagering decisions as a function of the card counting report prior to, or at any time during, the player playing in the tournament.

A variety of different card counting reports could be offered for "sale" to the player, with the contents of the card counting reports depending on the card counting method the player uses. Different card counting reports could be priced at different levels. More than one type of card counting report could be purchased. For example, a card counting report such as that shown in FIG. 2 might be priced at one level (say, 50 tournament chips, or $20.00, per round) and the card counting report of FIG. 3 might be priced at a different level (e.g., 100 tournament chips or $40.00, per round). The cost to be assigned to particular card counting reports will depend on such factors as the size of the pool of prize money, the cost of the buy-in, whether the reports are to provided for the entire tournament or for just one round or one or more hands, the theoretical advantage a particular card counting report is likely to provide to a player, and still other factors.

The feature of providing a facility of purchasing a card counting report for on-line poker tournaments is expected to encourage players that are not skilled in card counting to play in the tournaments. The player, in theory, will improve their performance in the tournament and increase the likelihood that they will be a winner if they have this advantage, than if they play without any assistance. This attraction will then lead to more players playing in the tournament, increasing the pot size for the winning player(s), and lead to more revenue for the tournament proprietor due to more players paying the entrance fees. In one possible embodiment, the rules of the tournament featuring rules favorable to card counting, such as described above.

The implementation of online blackjack tournaments with optional purchase of card counting reports by players can take a variety of forms within the scope of this invention. One representative and non-limiting example will be described below in conjunction with FIG. 7. It will be noted that a system and method for playing games, such as card games, over a computer network is described in PCT application publication WO 03/093921 A2, published Nov. 13, 2003, which is assigned to the assignee of the present invention. The entire contents of WO 03/093921 A2 are incorporated by reference herein. The system of the '921 PCT publication includes a central gaming server accessible over the Internet and enables participation in games such as poker games by individuals accessing diverse portal websites (gaming websites).

In the last several years, systems have been commercialized such as described in the '921 patent publication wherein a gaming website provides a facility for online game playing, particularly online poker playing. Such systems have become quite popular and gaming sites may host hundreds, even thousands of players at a time. In online poker, the success of an online poker web site ("online poker room") is directly related to the magnitude of a pool of would-be players who desire to play a game of online poker. Simply put, the larger the pool of players, the more virtual poker tables (i.e. poker games each accommodating a maximum of, say, 10 players)

the online poker software can spawn, thereby increasing the overall liquidity of the online poker room and increasing its attractiveness to other would-be players.

In order to maximize this size advantage, some online poker rooms operate under a centralized topology, in which there is a single operating entity ("operator") that owns and runs the gaming web site and the player pool is homogeneous (i.e. all players are registered with, or "belong to", this single operator). Blackjack tournaments as described herein could be played under a centralized topology. The operator of the web site makes its money in the tournament by collecting entrance fees of all players participating in the tournament. Under a centralized topology, a player will always be playing only with other players who are registered with the same (i.e. the only) operator. Settlement of player wagers is straightforward: 1) the operator collects its fees the tournament entry fees); 2) the buy-in fee for all the players in the tournament is pooled and paid to the winner(s) of the tournament. During tournament play, the players play with virtual chips as described above.

Blackjack tournaments as described herein can also be played under a distributed topology (also referred to, in the art, as a network topology). Under this topology, the player pool is heterogeneous, as players registered with different gaming web site operators are pooled together to maximize liquidity of the collective player pool. This means that players registered with different operators (web sites) could find themselves playing in the same blackjack table in the tournament. The principles underlying a distributed topology are set forth in the above-referenced patent application WO 03/093921 A2. The present inventive methods apply to both the centralized and distributed topologies.

Before describing the embodiments of online blackjack tournaments in greater detail, an explanation will be provided first of a computer-based system for online game playing, in which multiple distributed computing devices engage in playing of blackjack using a central server. The following description is offered by way illustration, and not limitation, of one possible environment in which the invention can be practiced.

Figure 7:
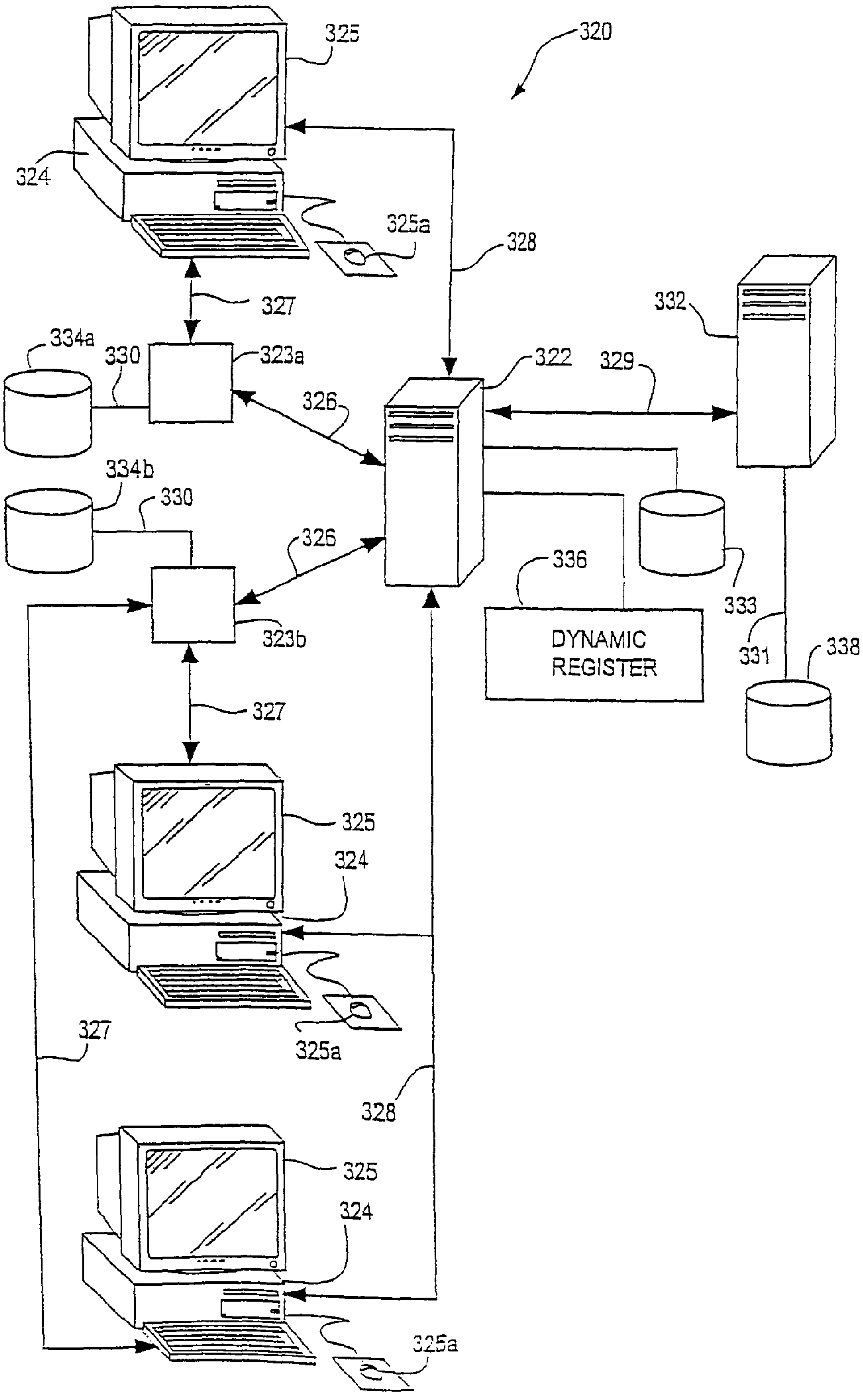
FIG. 7 is an illustration of a computer network system providing a facility for allowing remotely located blackjack players to play on-line tournament blackjack.

Referring to FIG. 7, a system for playing a game of multiplayer blackjack tournaments is indicated generally by reference numeral 320. The system 320 includes a central gaming server 322, and a number of portals (323*a*, 323*b*) in the form of portal websites on the World Wide Web of the Internet. In this embodiment each one of the portal websites is an online casino website hosted on a corresponding casino web server (not shown). Each one of the online casino websites (323*a*, 323*b*) is accessible by a blackjack player (not shown) through a user access facility 324 in the form of computing device such as an Internet-enabled computer workstation having a display 325 and an associated pointing device 325*a*, such as a mouse or, alternatively, a touchpad. In this embodiment, the online casino website 323*a* is shown as having one computer workstation 324 logically connected thereto, whereas casino website 323*b* is shown as being logically connected to two computer workstations 324. It will be appreciated by those skilled in the art that such an online casino websites 323*a*, 323*b* can be logically connected to any desired number of such computer workstations 324 simultaneously, which number is physically limited primarily by considerations of processing power, website hardware, and Internet access bandwidth.

The gaming server 322 includes a processing unit (such as a central processing unit, not shown) and a database 333 coupled to the processing unit which stores game information data for a plurality of instances of blackjack games played by the workstations 324, the number of chips held by each player, the size of each player's wager, and other data related to tournament play. The database 333 is updated continuously to store real-time or near real time information as to the plurality of instances of blackjack games, such as the name of each instance (e.g., table name), the players at each table, the wagers made, available seats, waiting time, etc. The gaming server 322 provides the game information data to the distributed computing devices 324. Such game information could be in the form of pages or updates to pages. Such data could be for example the cards dealt, the amounts wagered, whether the players wish to hit or sit, double, etc., scores, card counting reports, and other information, including the name or handle of the other players at a virtual table, and possibly a chat facility forwarding instant messages exchanged between players.

The system 320 includes, further, an administration facility 332 in the form of an application server, which is communicable with the gaming server 322 along a communication network 329. The administration facility may function as a credit facility for accounting for money paid by players to play in the tournament. In the event that the players pay with cash or cash equivalent to purchase the card counting report, the payment of cash or cash equivalent is accounted for by the administration facility 332. Further details on the administration facility are not particularly pertinent to the present discussion and the reader is directed to the published '932 PCT application cited above for further reference.

The gaming server 322, the online casino web servers (not shown) corresponding to the online casino websites 323*a*, 323*b*, the computer workstations 324 and the application web server 332 are capable of communicating with each other by means of an open communication network that is, in this embodiment, the Internet. The Internet is represented in FIG. 1 as separate logical communication networks (326, 327, 328, 329, 330 and 331).

The gaming server 322 operates under control of a server-stored program (not shown) capable of enabling a predetermined maximum number, say 3, 5 or 8 players to play at a table of multiplayer blackjack in a virtual tournament. Each instance of the blackjack game may take the form of a virtual card table playing blackjack. When the number of players for a given instance of a game reaches this predetermined maximum number, the server-stored program causes a further virtual blackjack table to be initiated, the new instance of the game also being capable of accommodating a further 3, 5 or 8 players. In this manner the gaming server is capable, under server-stored program control, to spawn as many separate instances of table of multiplayer blackjack as required in order to accommodate a pool of players who are all entered in the tournament.

The online casino websites (323*a*, 323*b*) enable a player who desires to join the blackjack tournament to request, by means of one of the computing devices 324, participation in the tournament game and, once admitted (by paying the entrance fee and buy-in), to join a virtual table and begin to play. Each player is assigned a certain number of chips to play with. During the play, each participating player at the virtual table is presented with an identical graphical user interface (GUI) on his respective computing device 324 by a separate, locally stored, program in the computing device. The GUI presents to the player a suitable display of blackjack game (not shown) with appropriate activatable icons that enable the player to make his own desired blackjack play decisions, place wagers, and to monitor the progress of the play at the blackjack table by viewing the game play decisions of the other participating players in the same instance of the game.

The stored program in the gaming server 322 also maintains a dynamic register 336 of all players admitted to, and actively participating in, the tournament together with data representative of a corresponding portal (323*a*, 323*b*) through which each participating player accessed the game. The dynamic register 336 also contains data representative of an instance of the game in which the player is participating.

As a part of this dynamic register 336, or using a separate mechanism such as a state engine or state machine, the gaming server 232 preferably keeps track of the current screen display of each computing device 324.

The computing devices 324 may take the form of a conventional personal computer operating under a Windows, Linux, or Macintosh operating system, provisioned with a web browser and a connection to the Internet. The devices 324 may include a pointing device 325A. The computing devices 324 may also take the form of portable, hand-held computing devices with a web browser and wireless internet access. The gaming server 322 may also operate under a Windows NT or other conventional operating system.

Multiplayer blackjack tournaments using a computing device or workstation 324 is facilitated by means of workstation-stored program (not shown) referred to, for convenience, as a client process that is executable on a computer workstation 324, and a corresponding server-stored program (not shown), or server process, that is executable on the gaming server 322. The server process (not shown) generates one or more random events that affect the outcome of the game, such as the dealing of cards to participating players. The server process also functions to deal randomly-selected cards to a "dealer" position at each virtual blackjack table and thus functions as the dealer or house for the tournament in accordance with dealer rules for the tournament. The client process (not shown) obtains the result of the random events in the form of datagrams transmitted from the gaming server 322, across the communication network 328, and displays the outcome of the game on the display monitor 325 in an intelligible manner.

In order to play multiplayer blackjack tournaments or other games from any computer workstation 324, the client process (not shown) must first be downloaded, e.g., from the gaming server 322 (or from the web site 323*a* or 323*b*) to that computer workstation. Such download will typically occur when the computing device 324 first accesses the home page of the web site 323*a* and 323*b*, and the user is presented with a message asking the user whether they wish to download the client process in order to play the games. The user selects a "yes" icon and the download then proceeds. The client process is then launched and communication between the computing device 324 and the gaming server 322 then proceeds. In a distributed topology scenario, a player wishing to participate in the multiplayer blackjack tournament uses a computing device 324 to access an online casino website 323*a*, 323*b* of his choice, but regardless of their choice of website the user is presented with the same underlying client process. The client processes will typically have different trademarks, color schemes, or "look and feel" depending on which online casino website they downloaded the client process from.

The players playing in the tournament are provided with an option of purchasing a one or more card counting reports. For example, when they sign up for the tournament, the player could be presented with a screen display which provides the player with a menu of options for purchasing one or more card counting reports. The menu may require the player to select when they wish to receive the report(s). The menu will also disclose the cost of the report(s) and the proprietor will receive payment at that time (if payment is by cash or cash equivalent) or alternatively the menu will disclose the cost in terms of number of chips the player foregoes when they receive their initial allotment of chips to play the tournament. In still another format, during play the player could be presented with an icon on their display, such as PURCHASE CARD COUNTING REPORT NOW!, which when activated would present a menu for purchasing a report during play. The player selects the options, format, etc. of the card counting reports and a datagram is sent from the workstation 324 to the gaming server 322. The gaming server then transmits card counting reports to the player over the network 328.

The gaming server maintains state information for each virtual blackjack table, including the sequence of cards dealt from a deck of virtual cards. The gaming server is programmed with software for computing card counting reports applicable to each virtual blackjack table in a variety of card counting systems. Accordingly, the gaming server may function like the computer 204 of FIG. 6 to generate and store data indicative of card counting reports in its database 333. When datagrams are sent to each workstation playing at a given virtual blackjack table to update the status of play (cards dealt, wagers made, results of play, busts, elimination of players, etc), such datagrams would include the applicable card counting report(s) for those workstations in which the players have paid to receive the card counting reports. Workstations associated with players that have not paid to receive the card counting reports would not receive such reports in their datagrams. Thus, the gaming server 322 functions to not only maintain game and card deck state information and generate datagrams for the workstations indicating status of play, it also generates card counting reports.

In one possible variation, the card counting reports could be generated locally by means of the client application on each workstation. The client applications receive datagrams indicating which cards have been revealed to the player (either through their own hand, by being dealt to the dealer, and cards dealt to other players), and thus the client application could just as easily compute card counting reports as the central gaming server 322. When the player signs up to the tournament and indicates they wish to receive-card counting reports, the client application could activate the card counting subroutine and cause the reports to be generated and displayed to the player in accordance with the terms selected by the player. If the player has elected to not purchase any card counting calculations, the card counting subroutine of the client application could be essentially turned off or not used.

The tournament may be conducted with rules and practices that facilitate card counting such as dealing from a deck of 52 cards down to the last card in the deck, revealing the cards of players that bust, revealing the cards of all the players, combinations of these rules, or with still other rules.

Since many modifications, variations, and changes in detail can be made to the described embodiments, it is intended that all matters in the foregoing description and shown in the accompanying drawings be interpreted as illustrative and not in a limiting sense. Further, it is intended to be understood that the following clauses further describe aspects of the present application.

(1) A method for conducting an online blackjack tournament by remotely located players over a computer network, comprising the steps of:

providing a pool of prize money for paying out to one or more winners of the tournament;

providing a set of one ore more rules for playing rounds of blackjack at the tournament; and conducting rounds of play of blackjack using the set of rules wherein during the rounds of play the players make wagers and receive winnings with chips provided by the proprietor of the tournament to the players; and providing a facility whereby players in the blackjack tournament may purchase a card counting report during play of the tournament.

(2) The method of clause (1), wherein the tournament is played at a plurality of virtual card tables and wherein the rules comprises a first rule of playing blackjack at the tables using a single deck of cards and a second rule of dealing the cards from the deck of cards down to the last card in the deck.

(3) The method of clause (1) or (2), wherein the card counting report is generated by a central gaming server process and transmitted to a workstation associated with a player who has purchased the card counting report.

(4) The method of clause (1) or (2), wherein the card counting report is generated by a client process executing on a workstation associated with a player who has purchased the card counting report.

(5). The method of clause (1), (2), (3), or (4), wherein the card counting report is purchased with cash or cash equivalent.

(6) The method of clause (1), (2), (3) or (4), wherein the card counting report is purchased with chips assigned to the player for playing in the tournament.

(7) The method of clause (1) through clause (6), wherein the facility comprises a display screen displayed on a workstation of a player playing in the tournament wherein the display screen provides a menu of options for the card counting report.

(8) The method of clause (7), wherein the menu of options comprises a menu of content of the card counting report.

(9) The method of clause (7) or clause (8), wherein the menu of options comprises a menu of options for receiving the card counting report.

(10) The method of clause (1) through clause (9), wherein the facility comprises a display screen displayed on a workstation of a player playing in the tournament wherein the display screen provides for purchase of a card counting report during play of a round of play at the tournament.

(11) The method of clause (1) through clause (10), wherein the card counting report comprises a display of a distribution of cards remaining in a standard deck of playing cards.

(12) Online blackjack tournament apparatus comprising a gaming server generating results of play of players playing in an online blackjack tournament, the players playing at virtual blackjack tables, the gaming server transmitting datagrams to workstations associated with the players;

a database storing data relating to play in the tournament, the data including data relating to cards revealed to players at the virtual blackjack tables, a server process comprising instructions stored in a memory accessing data from the database and responsively generating a card counting report for play occurring at at least one of the virtual blackjack tables, wherein the gaming server transmits the card counting report to a workstation in which the player associated with the workstation has purchased a card counting report for play at the tournament.

(13) The apparatus of clause (12), wherein the gaming server generates results of play in accordance with rules for the tournament, wherein the rules includes a rule of dealing cards from a deck of virtual cards down to the last card in the deck.

(14) The apparatus of clause (12) or clause (13), wherein the database stores data indicating the total amount of chips assigned to each player in the tournament, wherein the card counting report is purchased with chips, and wherein the price of the card counting report is reflected by reducing the number of chips assigned to the player that purchases a card counting report.

(15) The apparatus of clause (12), (13) or (14), further comprising a credit facility for accounting for money paid by players to play in the tournament, wherein the players pay with cash or cash equivalent to purchase the card counting report, and wherein the payment of cash or cash equivalent is accounted for by the credit facility.

(16) Online blackjack tournament apparatus comprising:

a memory storing a client process comprising a set of software instructions for execution on a workstation playing in the online blackjack tournament, wherein the client process includes instructions receiving datagrams from a central gaming server, the datagrams indicating cards revealed in the course of play at a virtual blackjack table at the tournament, and wherein the client process further includes a subroutine displaying a card counting report for play occurring at a virtual blackjack table, the client process displaying the card counting report on a display of the workstation.

(17) The apparatus of clause (16), wherein the client process generates a display screen providing a menu of options for the card counting report.

(18) The apparatus of clause (17), wherein the menu of options comprises a menu of content of the card counting report.

(19) The apparatus of clause (18), wherein the menu of options comprises a menu of options for receiving the card counting report.

(20) The apparatus of clause (16), (17), (18) or (19), wherein the client process includes a subroutine calculating the card counting report from data in datagrams received from the central gaming server.

While a number of exemplary aspects and embodiments have been discussed above, those of skill in the art will recognize certain modifications, permutations, additions and sub-combinations thereof are present in this disclosure. It is therefore intended that the following appended claims and claims hereafter introduced are interpreted to include all such modifications, permutations, additions and sub-combinations as are within their true spirit and scope.

I claim:

1. A method for conducting an online blackjack tournament by remotely located players over a computer network, comprising the steps of:

providing a pool of prize money for paying out to one or more winners of the tournament;

providing a set of one or more rules for playing rounds of blackjack at the tournament;

providing a database storing data relating to play in the tournament, the data including data relating to cards revealed to the remotely located players during the course of play of the tournament, and providing a gaming server configured for conducting multiple rounds of play of blackjack, the gaming server communicating with the remotely-located players over the computer network, each round of play consisting of multiple hands of blackjack, using the set of rules wherein during the rounds of play the players make wagers and receive winnings with chips provided by the proprietor of the tournament to the players; and providing a facility whereby players in the blackjack tournament may purchase a card counting report during play of the tournament in the form of an index or score resulting from a systematic card counting method providing guidance to the player for play of the round.

2. The method of claim 1, wherein the tournament is played at a plurality of virtual card tables and wherein the rules comprises a first rule of playing blackjack at the tables using a single deck of cards and a second rule of dealing the cards from the deck of cards down to the last card in the deck.

3. The method of claim 1, wherein the card counting report is generated by a central gaming server process and transmitted to a workstation associated with a player who has purchased the card counting report.

4. The method of claim 1, wherein the card counting report is generated by a client process executing on a workstation associated with a player who has purchased the card counting report.

5. The method of claim 1, wherein the card counting report is purchased with cash or cash equivalent.

6. The method of claim 5, wherein cash or cash equivalent exchanged for purchases of card counting reports during the tournament are added to the pool of prize money.

7. The method of claim 5, wherein cash or cash equivalent exchanged for purchases of card counting reports during the tournament are retained, at least in part, by the proprietor of the tournament.

8. The method of claim 1, wherein the card counting report is purchased with chips assigned to the player for playing in the tournament.

9. The method of claim 1, wherein the facility comprises a display screen displayed on a workstation of a player playing in the tournament wherein the display screen provides a menu of options for the card counting report.

10. The method of claim 9, wherein the menu of options comprises a menu of content of the card counting report.

11. The method of claim 9, wherein the menu of options comprises a menu of options for receiving the card counting report.

12. The method of claim 1, wherein the facility comprises a display screen displayed on a workstation of a player playing in the tournament wherein the display screen provides for purchase of a card counting report in the form of an index or score during play of a round of play at the tournament.

13. The method of claim 1, wherein the purchase of the card counting report is associated with a cost and wherein the cost of the card counting report varies depending on at least one of (1) the round of play in which the card counting report is purchased, (2) whether the card counting report is purchased for a limited number of hands in the round of play in which the card counting report is purchased, (3) whether the card counting report is purchased for all rounds of the tournament, (4) a theoretical advantage a particular card counting report is likely to provide to a player for play of a particular hand using the card counting report; (5) the size of the pool of prize money, and (6) the cost of a buy-in for the tournament.

14. The method of claim 1, wherein the pool of prize money is formed from buy-ins paid by players to enter the tournament, whereby both the pool of prize money and the payment of winnings with chips during the rounds of play eliminates exposure to the proprietor to losses for conducting the tournament.

15. The method of claim 14, wherein the pool of prize money is further formed from sponsorship fees paid by sponsors of the tournament other than the proprietor of the tournament.

16. The method of claim 1, wherein the rules comprise rules favorable for counting cards during hands of play of blackjack including a first rule of dealing the cards from a single deck of playing cards down to the last card in the deck and a second rule of exposing the cards of players including cards of players that bust.

17. Online blackjack tournament apparatus comprising a gaming server generating results of play of players playing in an online blackjack tournament, the players playing at virtual blackjack tables, the gaming server transmitting datagrams to workstations associated with the players;

a database storing data relating to play in the tournament, the data including data relating to cards revealed to players at the virtual blackjack tables, a server process comprising instructions stored in a memory for accessing data from the database and responsively generating a card counting report in the form of an index or score resulting from a systematic card counting method providing guidance to the player for play of the round for play occurring at at least one of the virtual blackjack tables, wherein the gaming server transmits the card counting report to a workstation in which the player associated with the workstation has purchased a card counting report for play at the tournament.

18. The apparatus of claim 17, wherein the gaming server generates results of play in accordance with rules for the tournament, wherein the rules includes a rule of dealing cards from a deck of virtual cards down to the last card in the deck.

19. The apparatus of claim 17, wherein the database stores data indicating the total amount of chips assigned to each player in the tournament, wherein the card counting report is purchased with chips, and wherein the price of the card counting report is reflected by reducing the number of chips assigned to the player that purchases a card counting report.

20. The apparatus of claim 17, further comprising a credit facility for accounting for money paid by players to play in the tournament, wherein the players pay with cash or cash equivalent to purchase the card counting report, and wherein the payment of cash or cash equivalent is accounted for by the credit facility.

21. Online blackjack tournament apparatus comprising:

a memory storing a client process comprising a set of software instructions for execution on a workstation playing in the online blackjack tournament, wherein the client process includes instructions receiving datagrams from a central gaming server, the datagrams indicating cards revealed in the course of play at a virtual blackjack table at the tournament, and wherein the client process further includes a subroutine displaying a card counting report in the form of an index or score resulting from a systematic card counting method providing guidance to the player for play occurring at a virtual blackjack table, the client process displaying the card counting report on a display of the workstation.

22. The apparatus of claim 21, wherein the client process generates a display screen providing a menu of options for the card counting report.

23. The apparatus of claim 22, wherein the menu of options comprises a menu of content of the card counting report.

24. The apparatus of claim 22, wherein the menu of options comprises a menu of options for receiving the card counting report.

25. The apparatus of claim 21, wherein the client process includes a subroutine calculating the card counting report from data in datagrams received from the central gaming server.

* * * * *